United States Patent
Schlomer et al.

(10) Patent No.: US 7,478,264 B1
(45) Date of Patent: Jan. 13, 2009

(54) STORAGE MANAGEMENT SERVER COMMUNICATION VIA STORAGE DEVICE SERVERS

(75) Inventors: Todd Benjamin Schlomer, Westminster, CO (US); David Randall Blea, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/045,334

(22) Filed: Mar. 10, 2008

(51) Int. Cl.
*G06F 11/00* (2006.01)
(52) U.S. Cl. .......................................................... 714/4
(58) Field of Classification Search ................. 714/4; 370/217, 218, 221
See application file for complete search history.

(56) References Cited

U.S. PATENT DOCUMENTS

| | | | | |
|---|---|---|---|---|
| 6,148,411 | A * | 11/2000 | Ichinohe et al. | 714/4 |
| 6,157,967 | A * | 12/2000 | Horst et al. | 710/19 |
| 6,178,521 | B1 * | 1/2001 | Filgate | 714/6 |
| 6,275,953 | B1 | 8/2001 | Vahalia et al. | |
| 6,829,720 | B2 * | 12/2004 | Schoenthal et al. | 714/4 |
| 6,928,514 | B2 | 8/2005 | Chatterjee et al. | |
| 6,934,878 | B2 * | 8/2005 | Massa et al. | 714/5 |
| 6,996,741 | B1 | 2/2006 | Pittelkow et al. | |
| 7,178,059 | B2 * | 2/2007 | Greenspan et al. | 714/13 |
| 7,370,226 | B2 * | 5/2008 | Findlay et al. | 714/4 |
| 2002/0188711 | A1 * | 12/2002 | Meyer et al. | 709/223 |
| 2003/0237016 | A1 * | 12/2003 | Johnson et al. | 714/4 |
| 2005/0021606 | A1 * | 1/2005 | Davies et al. | 709/203 |
| 2005/0099940 | A1 * | 5/2005 | Ohenoja et al. | 370/217 |

FOREIGN PATENT DOCUMENTS

EP 00910019 B1 4/1999

* cited by examiner

*Primary Examiner*—Bryce P Bonzo
(74) *Attorney, Agent, or Firm*—MaxValueIP, LLC

(57) ABSTRACT

This embodiment allows for a communications path between two storage management servers, when they do not have their normal HA communications path connected directly with one another, to send communications through the storage device server. An embodiment of this invention creates a request header that will direct the storage device server to perform certain operations. This request header is used to send commands from the storage management server to the storage device servers. This common connection with the storage device between the two storage management servers allow them to continue communication with each other if the direct link is severed.

1 Claim, 4 Drawing Sheets

STORAGE MANAGEMENT SERVER COMMUNICATION VIA STORAGE DEVICE SERVERS

BACKGROUND OF THE INVENTION

In disaster recovery solutions where there are storage management servers involved, it is necessary to provide a high availability (HA) solution so the user can use different storage management servers to control their storage devices for data replication.

In a HA environment, it is necessary for two or more storage management servers, e.g., IBM TotalStorage® Productivity Center for Replication (TPC-R), to communicate with each other to synchronize and maintain consistency of data.

The problem arises when the connection link between the two or more storage management servers is dropped. As a result, the storage management servers will not be in sync with one another and the servers will not be aware of new operations initiated by a user or from internal events.

This will become a problem when both storage management servers have connections to the storage devices as they are aware of actions of the alternate storage management server and such actions are interpreted as an error. Such errors will cause the data replication to suspend in certain cases which is not desirable as the users will not be protected against a disaster any longer.

SUMMARY OF THE INVENTION

This embodiment allows for a communications path between two storage management servers, when they don't have their normal HA communications path connected directly with one another, to send communications through the storage device server. An embodiment of this invention creates a request header that will direct the storage device server to perform certain operations. This request header is used to send commands from the storage management server to the storage device servers.

This common connection with the storage device between the two storage management servers allow them to continue communication with each other if the direct link is severed.

It would also be possible to just use the communication paths through the storage device servers to send any type of HA communications; rather than the normal HA communications path directly between the storage management servers. The storage device communications paths would be used when the direct communication paths don't exist. It is possible to never have a direct communications path between two or more storage management servers and just have them use the storage device servers to communicate any sort of HA communications.

The messages that are sent between multiple storage management servers don't necessarily need to be HA messages. These could be any type of command or notification that would need to be sent to the other storage management servers. HA is just one of those message sets that are necessary to be able to send over the communications path through a storage device to another storage management server.

DETAILED DESCRIPTION OF THE PREFERRED EMBODIMENTS

For purpose of demonstration and not limiting by it, TPC-R is used to refer to storage management server. Also, the example uses three TPC-R servers, however, the invention is just as applicable to two or more storage management servers in HA environment.

The basic HA environment will continue to work the same way. The only difference is when the TPC-R servers lose connection with one another to be able to continue in the usual HA environment, they will check with the storage devices to see if either TPC-R server still has a connection so they can still continue to communicate.

If TPC-R servers still have a connection with the storage device, they will then be able to continue in the HA environment by sending any HA notifications through the storage device rather than sending them directly to each other.

TPC-R servers #2 and #3 won't need to have a communications path between each other in most cases. There are some cases where they will need to have a communications path. The HA environment would determine which connections would be needed.

Figure 1:
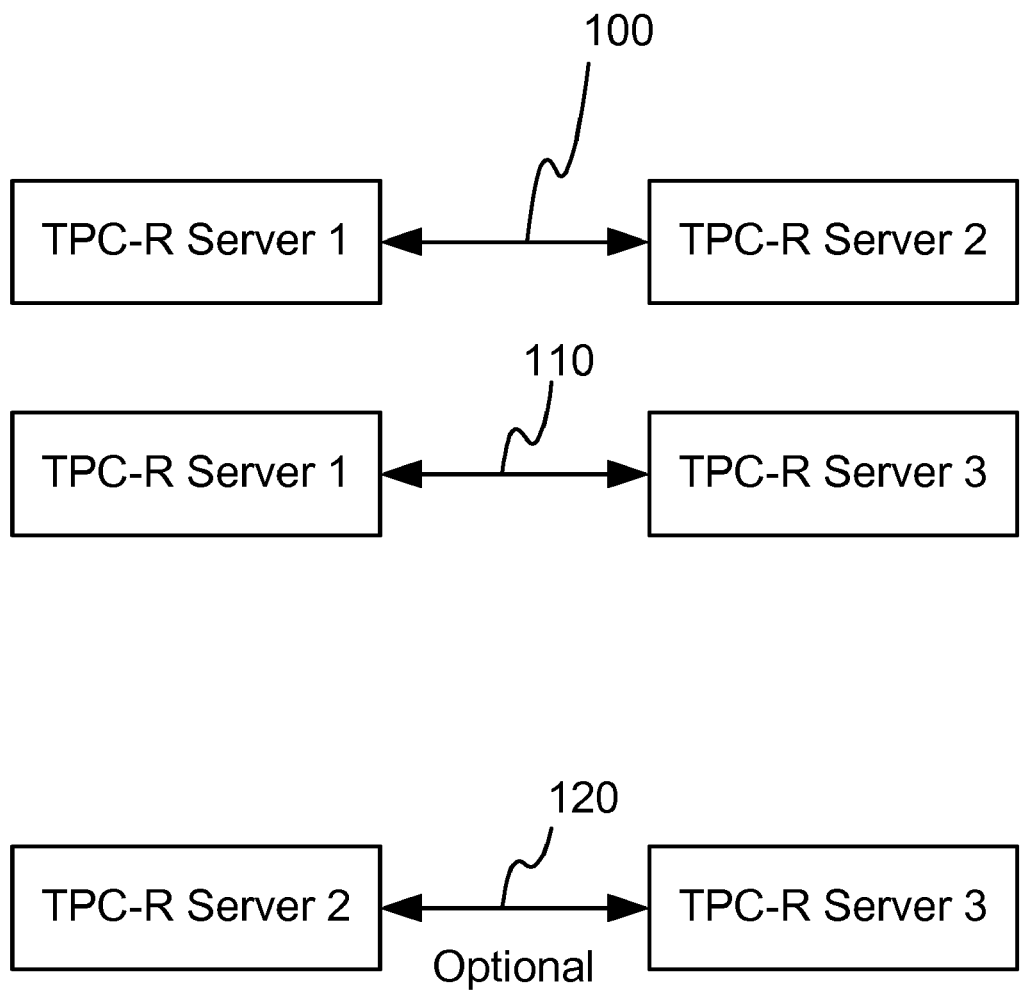
FIG. 1 is a schematic diagram of normal HA operation

FIG. 1 depicts the normal operation of normal HA operation. Server 1 communicates with server 2 and 3 through bi-directional channels (100 and 110 respectively). The bi-directional communication channel 120 between server 2 and server 3 is optional.

Figure 2:
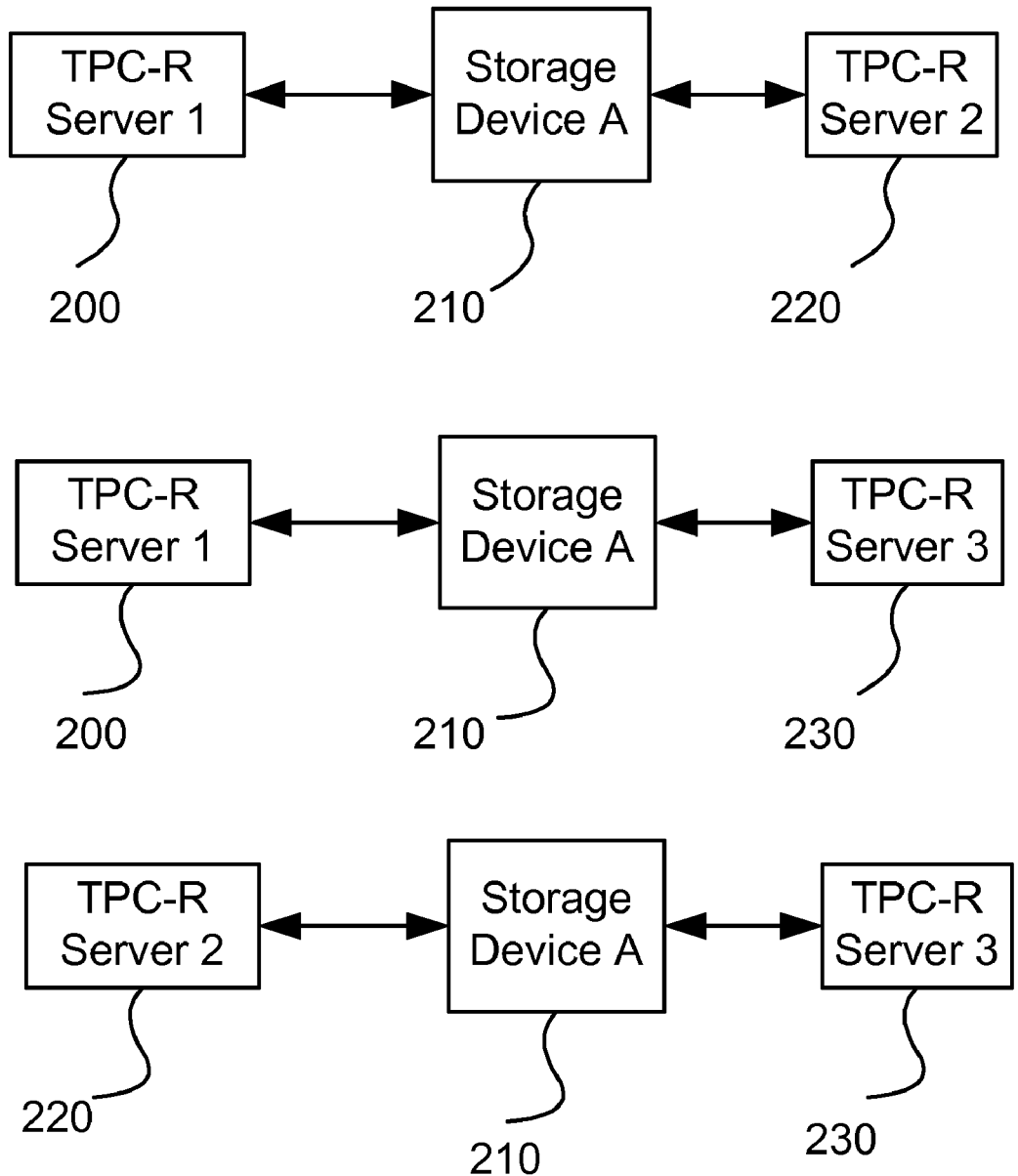
FIG. 2 is a schematic diagram of HA operation through storage device

FIG. 2 depicts the operation of the HA servers through a storage device. TPC-R Server 1 (200) communicates with TPC-R Server 2 (220) and TPC-R Server 3 (230) through Storage Device A (210). Moreover, TPC-R Server 2 (220) and TPC-R Server 3 (230) also communicate through Storage Device A (210).

If there are multiple storage devices connected to the TPC-R servers in the HA environment, then any storage device could be used for the HA communications path. As a result, if one of the storage devices went down for any reason or a TPC-R server lost connection with another one, the HA communications could be redirected to the connection to a storage device that is still running and accessible.

Figure 3:
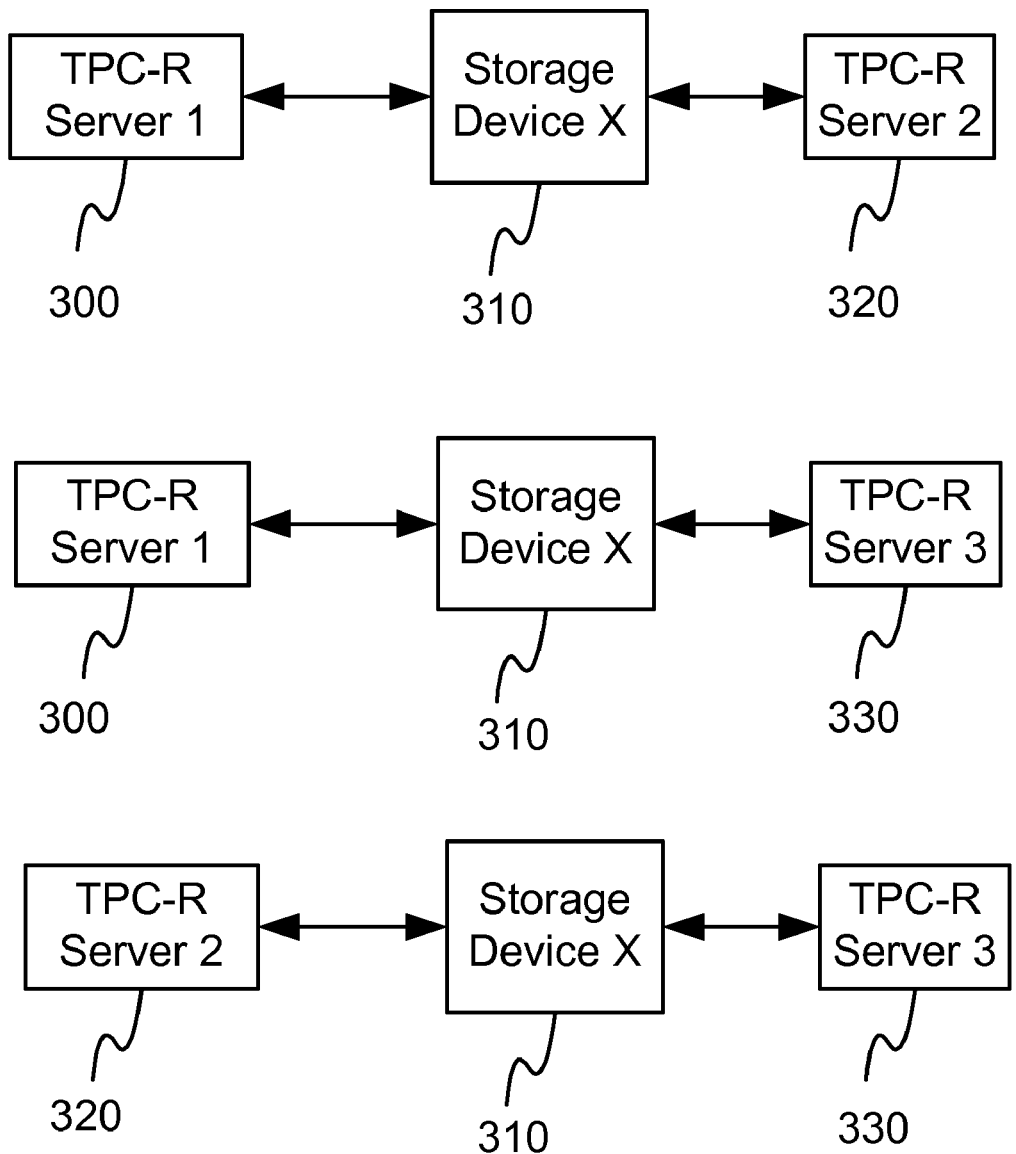
FIG. 3 is a schematic diagram of HA operation through multiple storage devices

FIG. 3 depicts the operation of HA servers through multiple storage devices. TPC-R Server 1 and TPC-R Server 2 communicate with TPC-R Server 2 and TRC-R Server 3 respectively, through Storage Device X where Storage Device X can represent any of Storage Devices A, B or C. (as shown by 300, 310, 320, 330)

The TPC-R servers in the HA environment don't have to use the same storage device for HA communications; it is preferred to use different connections to decrease the load on a single storage device where multiple storage devices are available.

Figure 4:
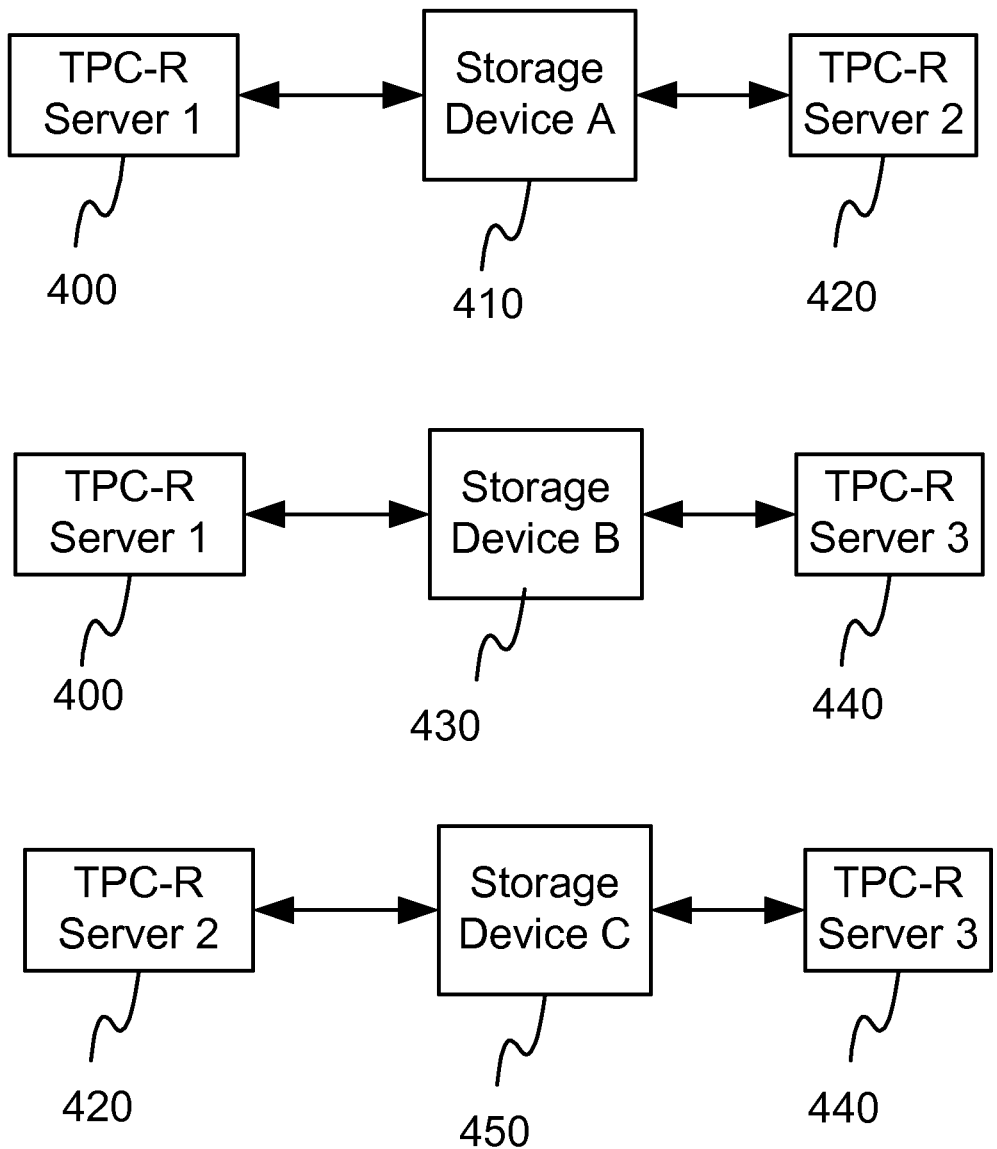
FIG. 4 is a schematic diagram of HA operation through multiple storage devices with load balancing.

FIG. 4 depicts the operation of HA servers with load balancing where TPC-R Server 1 is connected to TPC-R Server 2 through Storage Device A and where TPC-R Server 1 is connected to TPC-R Server 3 through Storage Device B and TPC-R Server 2 is connected to TPC-R Server 3 through Storage Device C specifically. (as shown by 400, 410, 420, 430, 440, 450)

The TPC-R servers would need to have a connection with the storage devices for this method of HA to work properly. This is the normal case of operation unless there is a disaster scenario. This basically adds another layer of protection onto the HA environment so there isn't a single point of failure for losing a single communications path between the TPC-R servers. The connection to the storage devices would use a different communication line, in order to provide for higher redundancy.

In order for the storage device to know which TPC-R server to route the HA communications to, each TPC-R server will need to have a unique identifier associated with it so that the storage device will know where to send the request; especially when there are multiple TPC-R servers connected to it.

Each of these IDs would be setup in the initial HA communications and all TPC-R Servers would be aware of unique IDs.

ID LIST

TPC-R server 1->ID_1
TPC-R server 2->ID_2
TPC-R server 3->ID_3

COMMUNICATIONS EXAMPLE WITH IDS

1. TPC-R Server 1 (sending command to TPC-R ID_2 through storage device A)
2. Storage Device A (finds TPC-R ID_2 and sends the command if connected; error sent back to TPC-R ID_1 if not connected)
3. TPC-R Server 2 (receives command from TPC-R ID_1 and sends acknowledgment and/or results if requested from TPC-R ID_1)

The TPC-R Server will know which storage device to send the HA communications through, by querying this information from the storage device itself. This will allow for the TPC-R server that is sending the communication to use load balancing, so it doesn't use the same storage device server for communication to all TPC-R servers in the HA environment.

Storage Device A (TPC-R servers connected)
TPC-R ID_1
TPC-R ID_2
TPC-R ID_3

An embodiment of the invention is a method of providing a redundant communication path in a high availability storage environment, the method is comprised of:

A first storage management server queries a first storage device server to determine a set of storage-connected management servers that the first storage device server is connected to and the first storage management server and the set of storage-connected management servers are in a plurality of storage management servers. The first storage device server is in a plurality of storage device servers and the plurality of storage management servers and the plurality of storage device servers are in the high availability storage environment.

Each of the plurality of storage management servers is identified by a corresponding unique identifier. The unique identifier is established at an initial high availability communication between the plurality of storage management servers. Moreover, a second storage management server is in the set of storage-connected management servers.

The first storage device server routing a high availability message sent from the first storage management server to the second storage management server, based on a header of the high availability message. This header indicates a unique identifier of the first storage management server and a unique identifier of the second storage management server.

In case the first storage device server fails to route the high availability message to the second storage management server, then the first storage device server notifies the first storage management server about the failure, the first storage management server determines an alternate communication path to the second storage management server via a second storage device server, wherein the second storage management server is connected to the second storage device server, and the second storage device server routes the high availability message from the first storage management server to the second storage management server.

The first storage management server communicates with multiple storage management servers of the plurality of storage management servers, via multiple storage device servers of the plurality of storage device servers to load-balance the communication with the multiple storage management servers.

A system, apparatus, or device comprising one of the following items is an example of the invention: storage device server, storage management system, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of storage device server and storage management system.

Any variations of the above teaching are also intended to be covered by this patent application.

The invention claimed is:

1. A method of providing a redundant communication path in a high availability storage environment, said method comprising:
   a first storage management server querying a first storage device server to determine a set of storage-connected management servers that said first storage device server is connected to;
   wherein said first storage management server and said set of storage-connected management servers are in a plurality of storage management servers;
   wherein said first storage device server is in a plurality of storage device servers;
   wherein said plurality of storage management servers and said plurality of storage device servers are in said high availability storage environment;
   wherein each of said plurality of storage management servers is identified by a corresponding unique identifier;
   wherein said unique identifier is established at an initial high availability communication between said plurality of storage management servers;
   wherein a second storage management server is in said set of storage-connected management servers;
   said first storage device server routing a high availability message sent from said first storage management server to said second storage management server, based on a header of said high availability message;
   wherein said header indicates a unique identifier of said first storage management server and a unique identifier of said second storage management server;
   if said first storage device server fails to route said high availability message to said second storage management server, then said first storage device server notifying said first storage management server about said failure, said first storage management server determining an alternate communication path to said second storage management server via a second storage device server, wherein said second storage management server is connected to said second storage device server, and said second storage device server routing said high availability message from said first storage management server to said second storage management server; and said first storage management server communicating with multiple storage management servers of said plurality of storage management servers, via multiple storage device servers of said plurality of storage device servers to load-balance said communicating with said multiple storage management servers.

* * * * *